(12) United States Patent
Kataoka

(10) Patent No.: US 12,539,910 B2
(45) Date of Patent: Feb. 3, 2026

(54) STEERING CONTROL DEVICE

(71) Applicant: DENSO CORPORATION, Kariya (JP)

(72) Inventor: Motoaki Kataoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 18/525,688

(22) Filed: Nov. 30, 2023

(65) Prior Publication Data

US 2024/0101185 A1   Mar. 28, 2024

Related U.S. Application Data

(63) Continuation of application No. PCT/JP2022/020617, filed on May 18, 2022.

(30) Foreign Application Priority Data

Jun. 4, 2021 (JP) ................................. 2021-094147

(51) Int. Cl.
    *B62D 5/04* (2006.01)
(52) U.S. Cl.
    CPC ........... *B62D 5/046* (2013.01); *B62D 5/0412* (2013.01)
(58) Field of Classification Search
    CPC ........ B62D 5/046; B62D 5/0412; B62D 1/00; B62D 5/0409; B62D 5/04; B62D 7/1545; B62D 11/003; B62D 15/00; B62D 15/0235; B62D 5/0463; B62D 6/10
    USPC ........................................................ 701/41
    See application file for complete search history.

(56) References Cited

U.S. PATENT DOCUMENTS

| 4,753,310 A * | 6/1988 | Hashimoto | B62D 5/0463 |
| | | | 180/446 |
| 9,592,850 B1 * | 3/2017 | Kataoka | B62D 15/025 |
| 2006/0076916 A1 * | 4/2006 | Heilig | B62D 5/0463 |
| | | | 318/437 |
| 2007/0144824 A1 * | 6/2007 | Tamaki | B62D 5/0463 |
| | | | 180/446 |
| 2007/0273317 A1 * | 11/2007 | Endo | B62D 5/0466 |
| | | | 318/432 |

(Continued)

FOREIGN PATENT DOCUMENTS

| CN | 109094640 A | * 12/2018 | ........... B62D 5/0421 |
| JP | 2015033941 A | * 2/2015 | ............... B62D 5/04 |

(Continued)

OTHER PUBLICATIONS

U.S. Appl. No. 18/525,692 and its entire file history.

*Primary Examiner* — Kurt Philip Liethen
*Assistant Examiner* — Anthony Donald Taylor, Jr.
(74) *Attorney, Agent, or Firm* — Maschoff Brennan

(57) ABSTRACT

A servo controller calculates a base assist command, which is a basic command value of the assist torque, so that the steering torque follows a target steering torque. An estimated load torque calculation section calculates an estimated load torque. A target steering torque calculation section calculates a target steering torque using a map that defines a relationship between the estimated load torque and the target steering torque. The estimated load torque calculation section calculates the estimated load torque based on the steering torque or the target steering torque and an estimated load calculation assist command corresponding to a calculation result of only a proportional integral control calculation among the control calculations in the servo controller.

5 Claims, 8 Drawing Sheets

(56) References Cited

U.S. PATENT DOCUMENTS

| | | | | |
|---|---|---|---|---|
| 2010/0235049 A1* | 9/2010 | Kariatsumari | ......... | B62D 5/046 |
| | | | | 318/609 |
| 2010/0292896 A1* | 11/2010 | Watanabe | ............ | B62D 5/0466 |
| | | | | 701/41 |
| 2011/0010051 A1* | 1/2011 | Ura | ...................... | B62D 5/0487 |
| | | | | 701/41 |
| 2013/0060427 A1* | 3/2013 | Kataoka | ............... | B62D 5/0466 |
| | | | | 701/42 |
| 2016/0107680 A1* | 4/2016 | Tsubaki | ............... | B62D 5/0472 |
| | | | | 701/41 |
| 2017/0144696 A1* | 5/2017 | Hirate | .................. | B62D 5/0463 |
| 2017/0253266 A1* | 9/2017 | Minamiguchi | ........ | B62D 6/008 |
| 2018/0118253 A1* | 5/2018 | Minamiguchi | ...... | B62D 5/0472 |
| 2019/0161116 A1* | 5/2019 | Moreillon | ............ | B62D 15/025 |
| 2019/0202454 A1* | 7/2019 | Komiyama | ............. | G08G 1/166 |
| 2019/0256133 A1* | 8/2019 | Tsubaki | .................. | B62D 6/008 |
| 2019/0359248 A1* | 11/2019 | Tsubaki | ............... | B62D 5/0463 |
| 2020/0039577 A1* | 2/2020 | Kataoka | ................. | B62D 6/008 |
| 2020/0108857 A1* | 4/2020 | Tsubaki | .................... | B62D 5/04 |
| 2020/0290668 A1* | 9/2020 | Moreillon | .............. | B62D 6/005 |
| 2020/0369316 A1* | 11/2020 | Tsubaki | ............... | B62D 5/0493 |
| 2021/0061344 A1* | 3/2021 | Kitazume | .............. | B62D 1/286 |
| 2022/0009546 A1* | 1/2022 | Mori | ...................... | B62D 5/049 |
| 2022/0063710 A1* | 3/2022 | Tsubaki | ............... | B62D 5/0409 |
| 2022/0097760 A1* | 3/2022 | Mori | ...................... | B62D 6/008 |

FOREIGN PATENT DOCUMENTS

| | | | | |
|---|---|---|---|---|
| JP | 2015199415 A | * | 11/2015 | ............... B62D 6/00 |
| JP | 6252027 B | | 12/2017 | |
| JP | 6387657 B | | 9/2018 | |

\* cited by examiner

STEERING CONTROL DEVICE

CROSS REFERENCE TO RELATED APPLICATIONS

This application is a continuation application of International Patent Application No. PCT/JP2022/020617 filed on May 18, 2022, which designated the U.S. and based on and claims the benefits of priority of Japanese Patent Application No. 2021-094147 filed on Jun. 4, 2021. The entire disclosure of all of the above applications is incorporated herein by reference.

TECHNICAL FIELD

The present disclosure relates to a steering control device.

BACKGROUND

Conventionally, in a steering device for controlling assist torque output by a motor, a technique is known in which a target steering torque is calculated based on an estimated load torque, and a base assist command is calculated by a servo controller so that the steering torque follows the target steering torque.

SUMMARY

An object of the present disclosure is to provide a steering control device that prevents rattle noise due to generation of pulse noise even when the change in gradient at the breakpoint of the map between the estimated load torque and the target steering torque is large.

The present disclosure is a steering control device that controls an assist torque output by a motor connected to a steering system mechanism that generates steering torque. The steering control device includes a servo controller, an estimated load torque calculation section, and a target steering torque calculation section.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
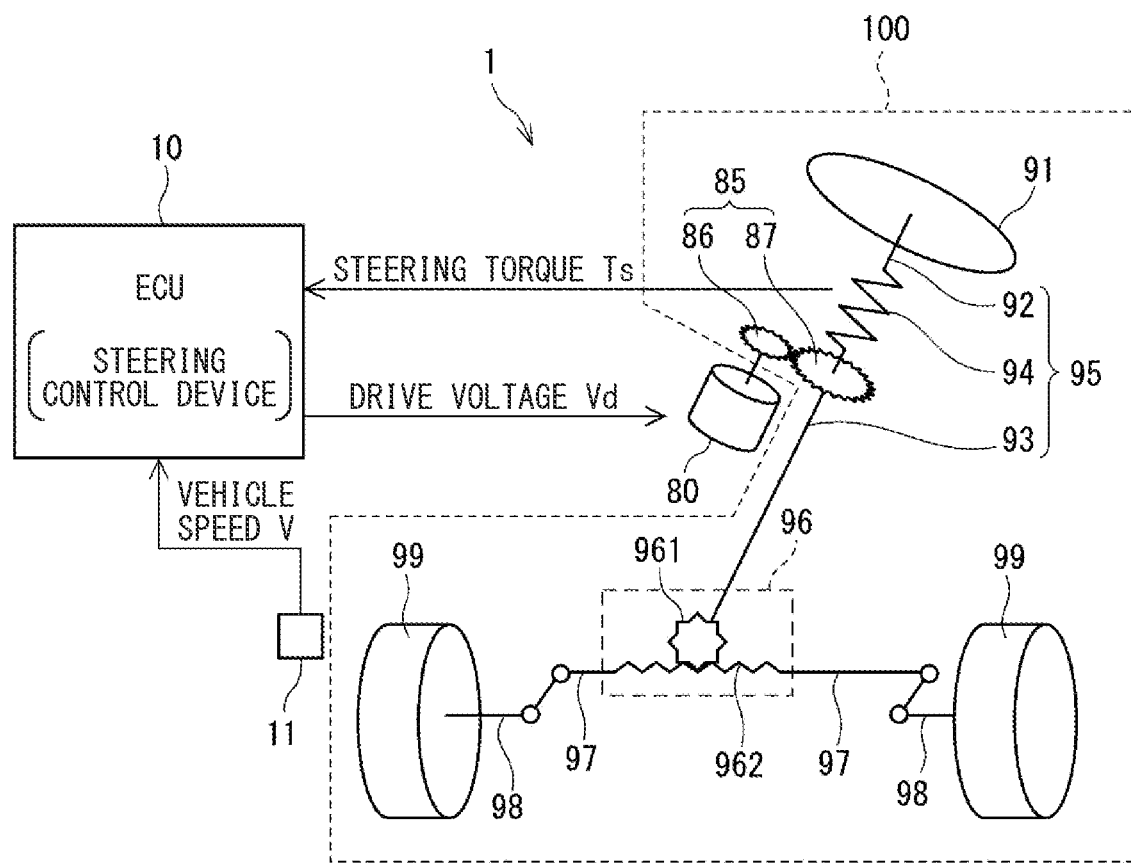
FIG. 1 is a schematic diagram showing an electric power steering system.

In an assumable example, in a steering device for controlling assist torque output by a motor, a technique is known in which a target steering torque is calculated based on an estimated load torque, and a base assist command is calculated by a servo controller so that the steering torque follows the target steering torque. For example, in a steering control device, a target generation unit adds a target steering torque and a base assist command to calculate an estimated load torque. A torque converter of the target generation unit calculates the target steering torque using a map that defines a value of the target steering torque with respect to the estimated load torque.

Further, in a steering control device, a servo controller generates a base assist command through PID control so that the steering torque follows the target steering torque.

The target steering torque is obtained by interpolation calculation using a map. When the estimated load torque, which is a map input, changes during steering, a change in the output with respect to a change in the input is constant within an interpolation interval. However, a rate of change of the output changes abruptly due to the change in gradient when passing a breakpoint of the map.

For example, when a map is adapted to obtain a steering feel or a desired behavior, there are cases where the change in gradient at the breakpoint of the map becomes large especially in a small signal region where the estimated load torque is close to zero. If the change in gradient at the breakpoint of the map is large, when passing that point, a differential operation output of the servo controller changes. As a result, a base assist command changes. Then, a pulse noise is generated in the process of calculating the target steering torque in the next calculation cycle using the feedback base assist command. This will vibrate the motor, possibly causing rattle noise.

An object of the present disclosure is to provide a steering control device that prevents rattle noise due to generation of pulse noise even when the change in gradient at the breakpoint of the map between the estimated load torque and the target steering torque is large.

The present disclosure is a steering control device that controls an assist torque output by a motor connected to a steering system mechanism that generates steering torque. The steering control device includes a servo controller, an estimated load torque calculation section, and a target steering torque calculation section.

The servo controller calculates a base assist command, which is a basic command value of the assist torque, so that the steering torque follows the target steering torque.

The estimated load torque calculation section calculates an estimated load torque that is load torque that acts on a steering shaft of the steering system mechanism and changes according to steering. The target steering torque calculation section calculates a target steering torque using a map that defines a relationship between the estimated load torque and the target steering torque.

The estimated load torque calculation section calculates the estimated load torque based on the steering torque or the target steering torque and an estimated load calculation assist command corresponding to a calculation result of only a proportional integral control calculation among the control calculations in the servo controller.

As a result, in the present disclosure, even if there is a large gradient change at a breakpoint of a map, especially in a small signal region, a steep pulse is not superimposed on the base assist command. Therefore, steering vibration such as rattle noise can be prevented, and smooth operation with low vibration can be obtained. Therefore, the degree of freedom in fitting is increased. Also, a low-pass filter of the estimated load torque calculation section can be changed from a secondary filter to a primary filter, which simplifies the calculation process.

A plurality of embodiments of the steering control device will be described based on the drawings. An ECU as a "steering control device" is applied to an electric power steering system of a vehicle and calculates a motor output command. The following embodiments mainly show examples applied to the electric power steering system. In the electric power steering system, the steering control device outputs an assist torque command to a steering assist motor. The following first and second embodiments are collectively referred to as "the present embodiment".

[Electric Power Steering System]

The configuration of the electric power steering system will be described with reference to FIG. 1. For symbols of the assist torque Ta and the base assist command Tb*, refer to FIG. 2. The electric power steering system 1 is configured to assist a driver's operation of a steering wheel 91 by a driving torque of a motor 80. A steering wheel 91 is fixed to one end of a steering shaft 92, and an intermediate shaft 93 is provided on the other end of the steering shaft 92. The steering shaft 92 and the intermediate shaft 93 are coupled by a torsion bar of a torque sensor 94. These components provide a steering shaft 95. The torque sensor 94 detects a steering torque Ts based on a torsion angle of a torsion bar.

A gear box 96 including a pinion gear 961 and a rack 962 is provided at an end of the intermediate shaft 93 opposite to the torque sensor 94. When a driver rotates the steering wheel 91, the pinion gear 961 rotates together with the intermediate shaft 93, and the rack 962 moves to the right and left with the rotation of the pinion gear 961. Tie rods 97 are provided at both ends of the rack 962 and coupled to tires 99 via knuckle arms 98. The tie rods 97 reciprocate right and left to pull and push the knuckle arms 98 and change the direction of the tires 99.

The motor 80 is, for example, a three-phase AC brushless motor, which outputs an assist torque Ta for assisting a steering force of the steering wheel 91 in accordance with a drive voltage Vd outputted from the ECU 10. In case of the three-phase AC motor, the drive voltage Vd means each phase voltage of U phase, V phase and W phase. Rotation of the motor 80 is transmitted to the intermediate shaft 93 via a speed reduction mechanism 85 having a worm gear 86, a worm wheel 87 and the like. In addition, a steering of the steering wheel 91 and rotation of the intermediate shaft 93 caused by a reaction force from a road surface are transmitted to the motor 80 via the speed reduction mechanism 85.

The electric power steering system 1 shown in FIG. 1 is a column-assisted type in which the rotation of the motor 80 is transmitted to the steering shaft 95. However, the ECU 10 of the present embodiment may be applied to an electric power steering system of a rack assist type. In another embodiment, a multi-phase AC motor other than three phases or a DC motor with brushes may be used as the steering assist motor.

Here, the entire structure from the steering wheel 91 to the tires 99 to which the steering force of the steering wheel 91 is transmitted is referred to as a steering system mechanism 100. The ECU 10 controls the steering torque Ts generated by the steering system mechanism 100 by controlling the assist torque Ta output by the motor 80 connected to the steering system mechanism 100. Further, the ECU 10 is configured to acquire a vehicle speed V detected by a vehicle speed sensor 11 provided at a predetermined part of the vehicle.

The ECU 10 operates by electric power from an in-vehicle battery (not shown), and calculates a base assist command Tb*, which is a basic command value of the assist torque, based on the steering torque Ts detected by the torque sensor 94, the vehicle speed V detected by the vehicle speed sensor 11, and the like. In the present embodiment, a correction torque is not added to the base assist command Tb*, and the base assist command Tb* is directly output as the command value of the assist torque Ta.

When the drive voltage Vd calculated based on the base assist command Tb* is applied to the motor 80, the motor 80 outputs the assist torque Ta, causing the steering mechanism 100 to generate the steering torque Ts. Various processes in the ECU 10 may be software processes of a program stored in a tangible memory device such as a ROM and executed by a CPU, or may be hardware processes executed by discrete electronic circuits.

[ECU]

First Embodiment

The configuration of the ECU 10 of the first embodiment will be described with reference to FIG. 2. The ECU 10 includes an estimated load torque calculation section 20, a target steering torque calculation section 30, a deviation calculation section 39, a servo controller 400, a current feedback ("FB" in the figure) section 70, and the like.

The estimated load torque calculation section 20 calculates an estimated load torque Tx based on a target steering torque Ts* and an estimated load calculation assist command Tbx*. That is, the estimated load calculation assist command Tbx* is used in place of the base assist command Tb* in the configuration of FIG. 3 of Japanese Patent No. 6314752 (corresponding to U.S. Pat. No. 10,259,489 B2). The disclosure of which is incorporated herein by reference. The estimated load torque Tx is a load torque that acts on the steering shaft 95 of the steering system mechanism 100 and changes according to the steering. Whether the estimated load torque Tx or the steering torque Ts is positive or negative is defined according to the rotational direction of the steering shaft 95 so that the torque in one rotational direction is positive and the torque in the opposite direction is negative.

The estimated load torque calculation section 20 includes an adder 21 and a low-pass filter ("LPF" in the FIG. 22. The adder 21 adds the estimated load calculation assist command Tbx* fed back from the servo controller 400 and the target steering torque Ts* fed back from the target steering torque calculation section 30. The estimated load calculation assist command Tbx* corresponds to a calculation result of only the proportional integral control calculation among the control calculations in the servo controller 400, that is, the calculation result not including the differential control calculation. Details of the estimated load calculation assist command Tbx* will be described later with reference to FIG. 6.

The low-pass filter 22 extracts a frequency component of a band having a predetermined frequency, for example 10 Hz or lower, from the added torque. The estimated load torque calculation section 20 outputs the frequency component extracted by the low-pass filter 22 as the estimated load torque Tx.

The target steering torque calculation section 30 calculates the target steering torque Ts* using a map 33 that defines the relationship between the estimated load torque Tx and the target steering torque Ts*. The target steering torque calculation section 30 includes a sign determination part ("sgn" in the FIG. 31, an absolute value determination part ("|u|" in the FIG. 32, a map 33, and a multiplier 34. The sign determination part 31 determines whether the estimated load torque Tx is positive or negative, that is, the sign according to the rotation direction of the steering shaft 95. The absolute value determination part 32 calculates an absolute value of the input u, that is, the estimated load torque Tx.

The map 33 is a map in which the estimated load torque Tx is in a positive region, that is, a map of absolute values. In the negative region of the estimated load torque Tx, the map is symmetrical with respect to the positive region. The target steering torque Ts* has a positive correlation with the estimated load torque Tx, and increases logarithmically as the estimated load torque Tx increases.

Specifically, the map 33 is represented by a polygonal line connecting a plurality of points indicating the value of the target steering torque Ts* with respect to a specific value of the estimated load torque Tx for each vehicle speed V. The target steering torque Ts* for an arbitrary estimated load torque Tx is obtained by interpolation calculation of the map 33. As the vehicle speed V increases, the target steering torque Ts* for the same estimated load torque Tx increases. The range of the estimated load torque Tx, which is the horizontal axis of the map 33, is approximately 0 to 30 [Nm], and the range of the target steering torque Ts* is approximately 0 to 6 [Nm].

Figure 2:
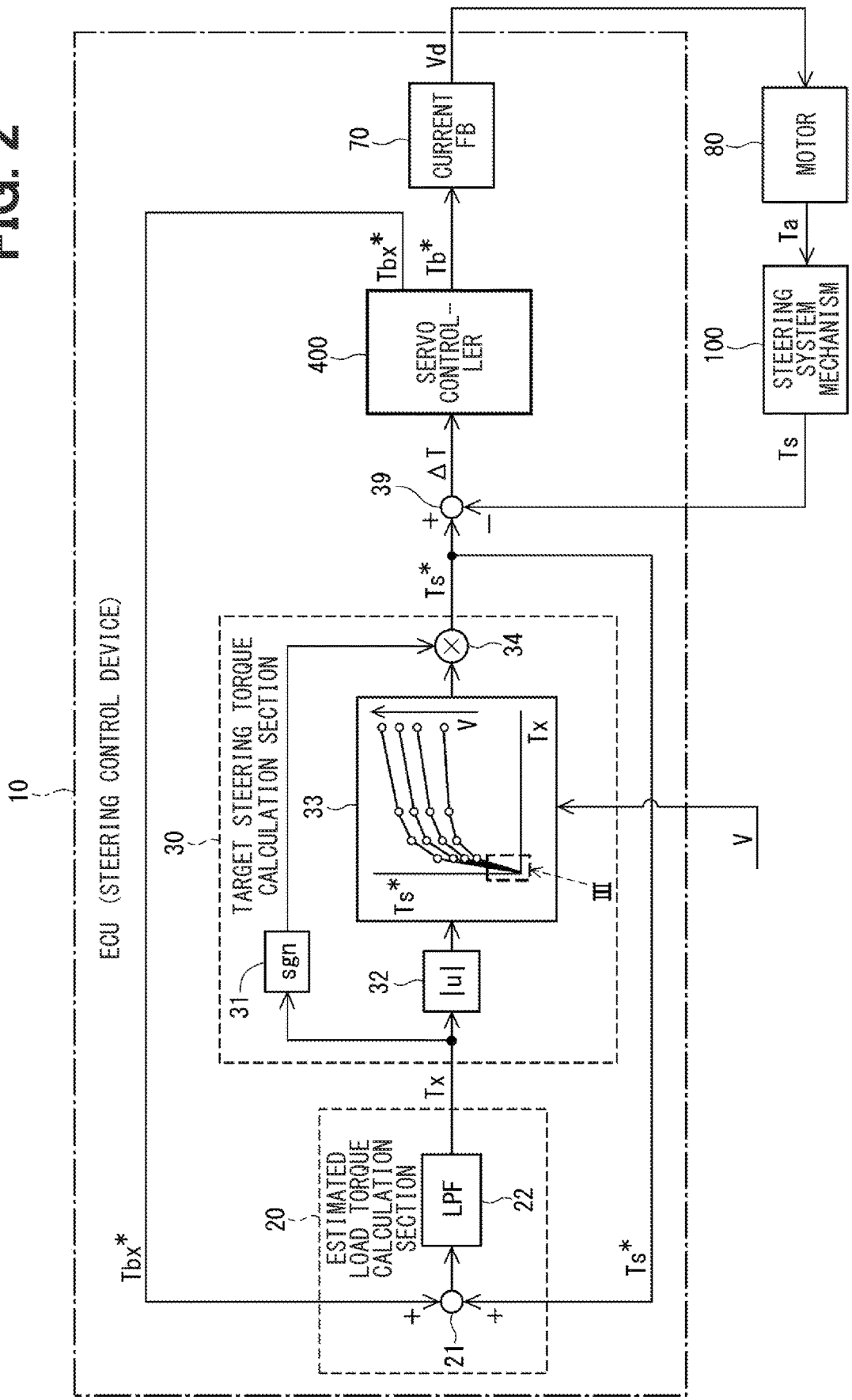
FIG. 2 is a schematic configuration diagram of an ECU (steering control device) of a first embodiment.
Figure 3:
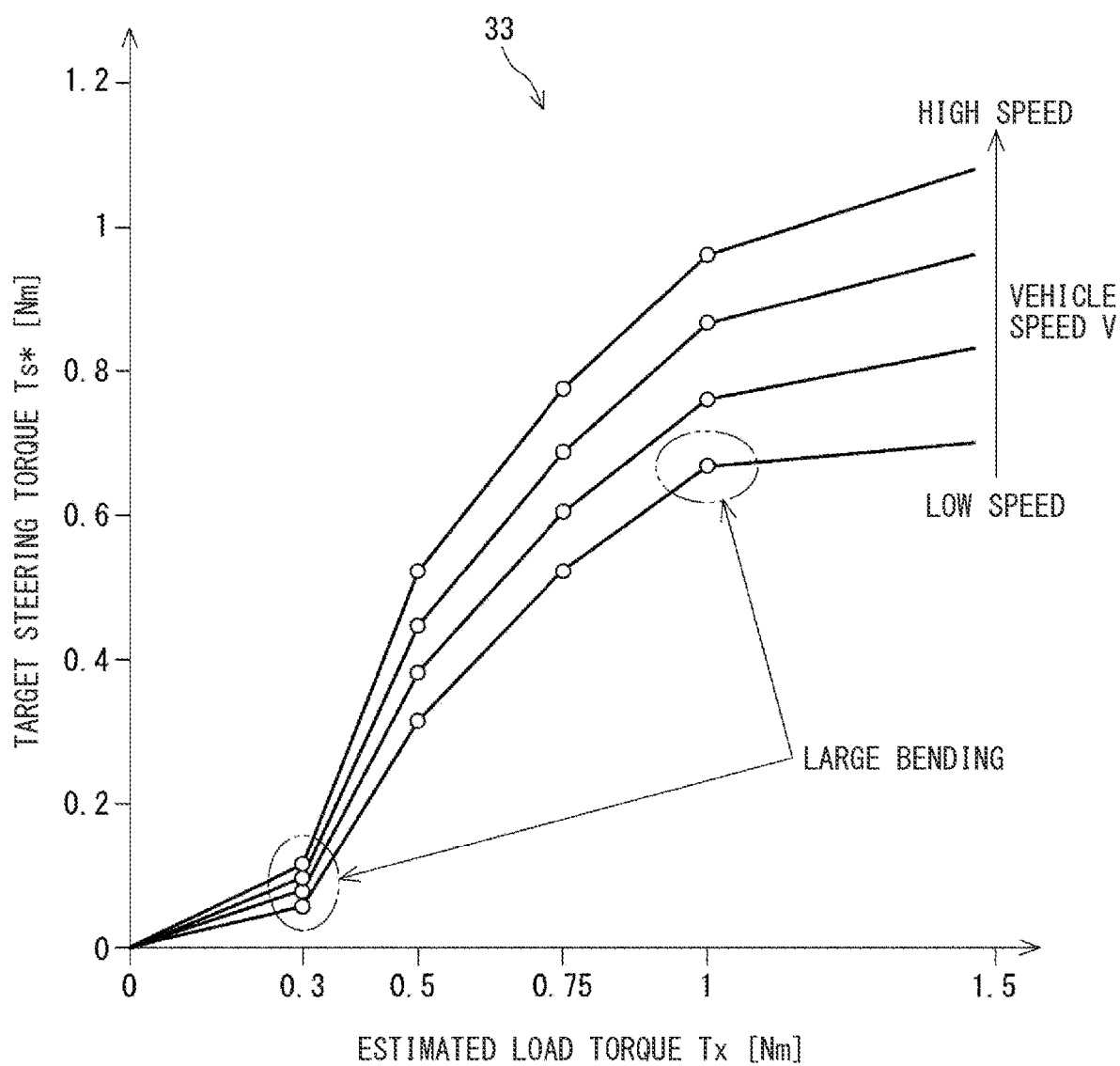
FIG. 3 is an enlarged view of a small signal region in an estimated load torque-target steering torque map.

FIG. 3 shows an enlarged small signal region where the estimated load torque Tx is close to 0 in the map 33 of FIG. 2. This map 33 is adapted in a small signal region in order to obtain steering feel and desired behavior. As a result of the adaptation, the rate of change of the target steering torque Ts* increases at a breakpoint where the estimated load torque Tx is 0.3 [Nm], and the bending is large. At this breakpoint, the second derivative is positive, while the other breakpoints have negative second derivative. Also, at the breakpoint where the estimated load torque Tx is 1 [Nm], the change rate of the target steering torque Ts* suddenly decreases and the bending is large. The influence of such a large bending at the breakpoint will be described later with reference to FIGS. 4 and 5.

Returning to FIG. 2, the multiplier 34 multiplies the absolute value of the target steering torque Ts* map-calculated based on the absolute value of the estimated load torque Tx by a sign corresponding to the sign of the estimated load torque Tx. The target steering torque Ts* output by the target steering torque calculation section 30 is input to the deviation calculation section 39 and fed back to the estimated load torque calculation section 20.

The deviation calculation section 39 calculates a steering torque deviation $\Delta T$ (=Ts*−Ts), which is the difference between the target steering torque Ts* and the steering torque Ts. The steering torque deviation $\Delta T$ is input to the servo controller 400. The servo controller 400 calculates the base assist command Tb* so that steering torque Ts follows target steering torque Ts*. A detailed configuration of the servo controller 400 of the present embodiment will be described later with reference to FIG. 6.

The current feedback section 70 applies the drive voltage Vd to the motor 80 so that the assist torque corresponding to the base assist command Tb* is applied particularly to the steering shaft 95 on the tire 99 side of the torque sensor 94. Since the current feedback control exemplified above is known well in the field of motor control, no detailed description will be made.

Figure 4:
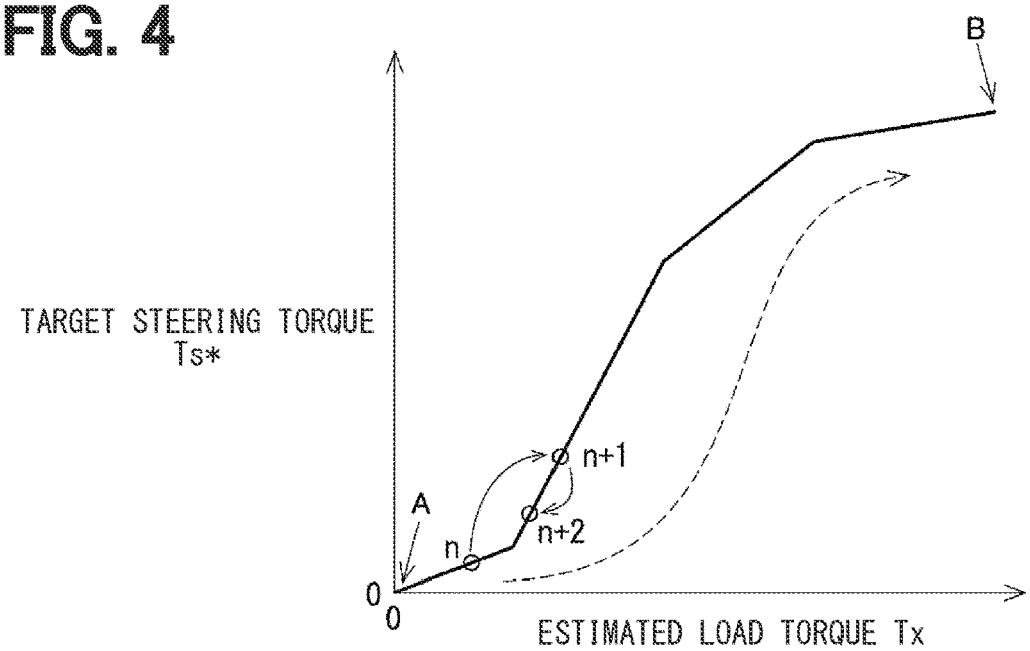
FIG. 4 is a diagram for explaining a principle of occurrence of a problem phenomenon in map calculation.

Next, with reference to FIGS. 4 and 5, the principle of occurrence of a problem phenomenon in the map calculation of the target steering torque calculation section 30 will be described. FIG. 4 shows a schematic diagram of a map of the estimated load torque Tx and the target steering torque Ts*. Consider a case where the estimated load torque Tx monotonically increases and the operating point on the map advances from point A to point B, as indicated by the dashed arrow. Here, it is assumed that the base assist command Tb* is fed back to the estimated load torque calculation section 20.

Figure 5:
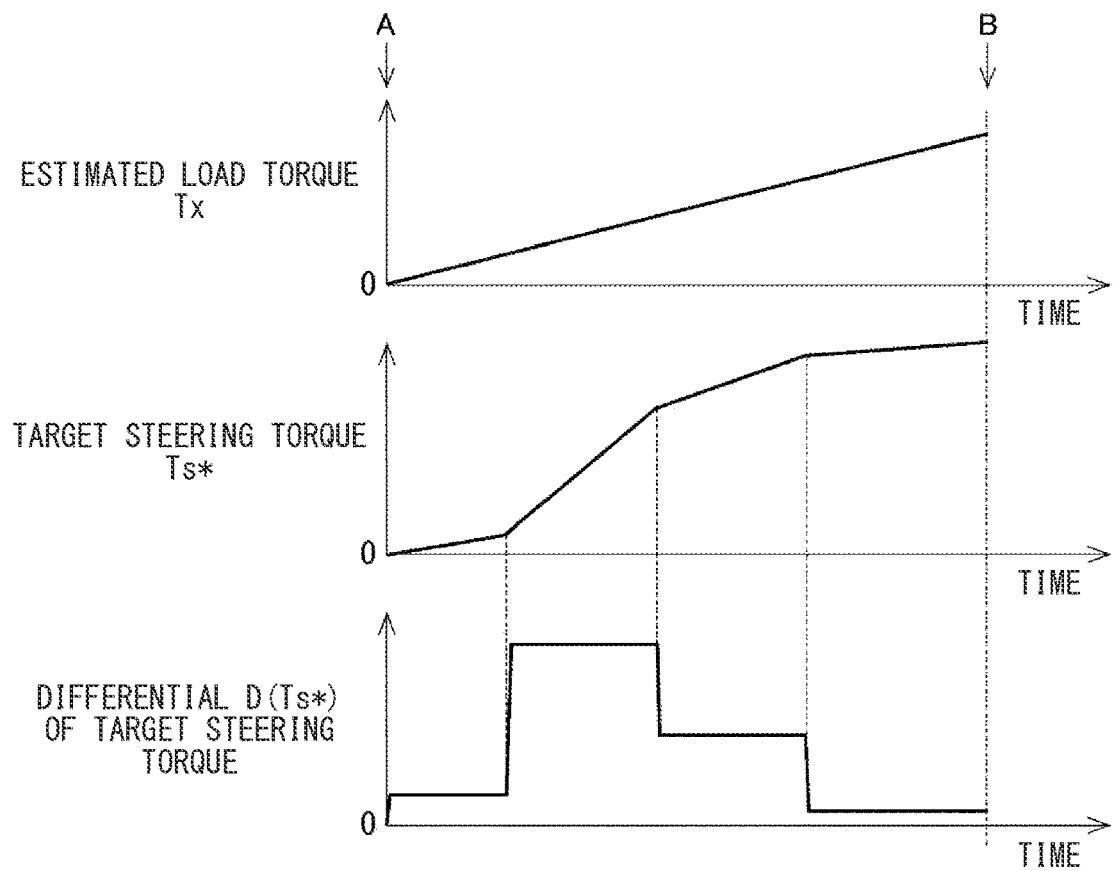
FIG. 5 is a time chart that supplements FIG. 4.

If the estimated load torque Tx increases linearly, changes in the target steering torque Ts* and the differential D(Ts*) of the target steering torque becomes like a time waveform shown in FIG. 5. In this case, the differential D(Ts*) of the target steering torque, that is, the gradient change of the map is not a pulse but a step change. However, when a closed loop is formed in which the base assist command Tb* including the differential control component of the steering torque deviation $\Delta T$ from the servo controller 400 is fed back to the estimated load torque calculation section 20, the following phenomenon occurs.

When the estimated load torque Tx changes from time n to the next time (n+1) in FIG. 4, the signal that has passed through the servo controller 400 has relatively large step changes mainly in the derivative control component. At this time, when the estimated load torque Tx increases, the steering torque deviation $\Delta T$ increases and the steering torque deviation differential D($\Delta T$) becomes positive. Also, as will be described later, the differential gain Kd in the PID control formula is negative, so the base assist command Tb* tends to decrease.

Then, at the next time (n+2), the estimated load torque Tx calculated based on the decreased base assist command Tb* decreases. Then, the target steering torque Ts* calculated based on the estimated load torque Tx is smaller than the previous value at time (n+1). Therefore, the differentiation of the target steering torque differentiation D(Ts*), which had changed in steps until the previous time, changes in a reverse step, resulting in a pulse. This appears as pulse noise in the base assist command Tb*.

In this way, especially in a small signal region, when the gradient change at the breakpoint of the map is large, the pulse noise appearing in the base assist command Tb* will vibrate the motor 80, possibly causing rattle noise. Here, there is a possibility that sound vibration can be eliminated by taking a large number of points in the map and adapting so as to change smoothly. However, it is necessary to repeat trial and error between adaptation and noise and vibration evaluation, which imposes restrictions on adaptation. The present embodiment aims to prevent rattle noise due to generation of pulse noise even when the change in gradient at the breakpoint of the map between the estimated load torque Tx and the target steering torque Ts* is large.

Figure 6:
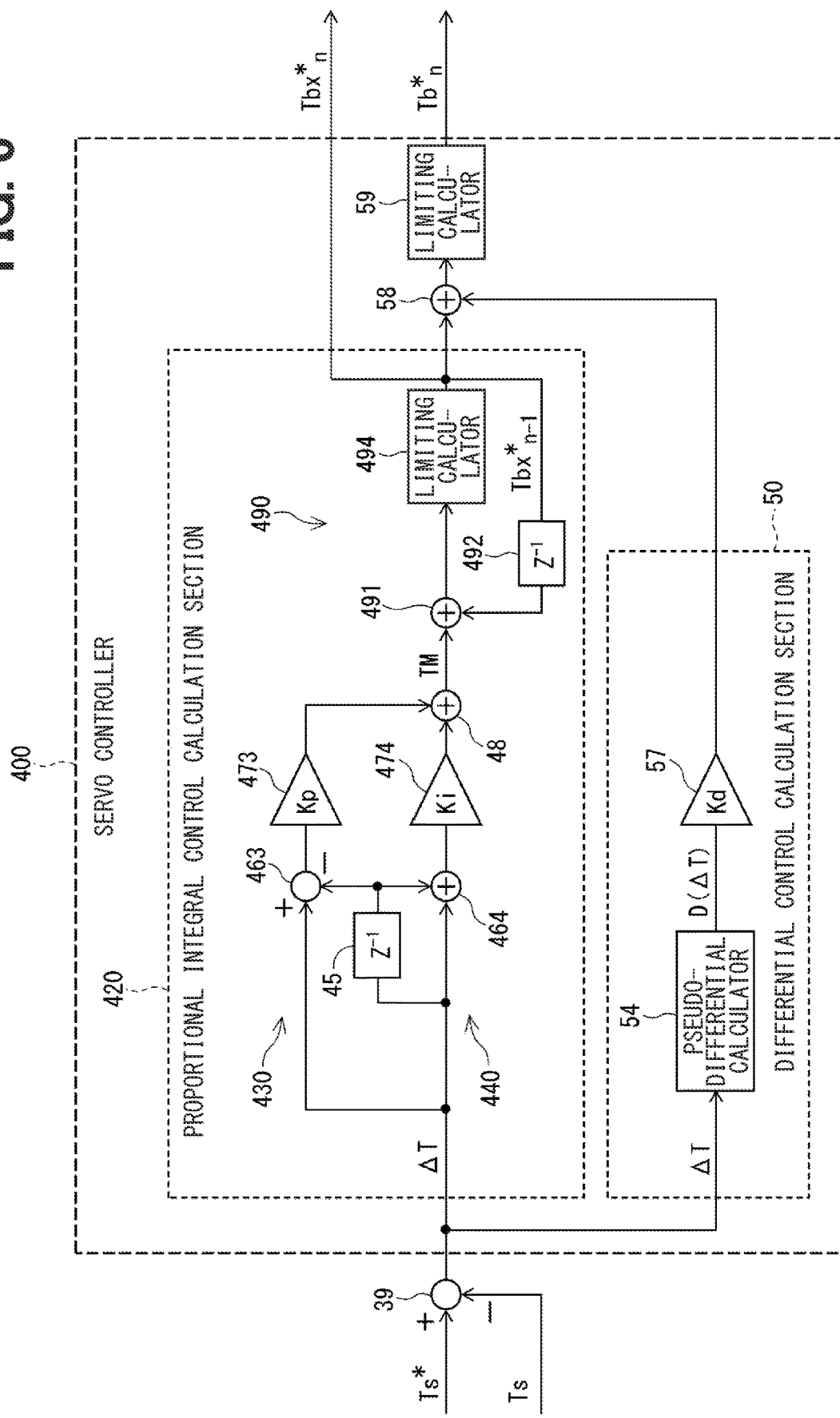
FIG. 6 is a block diagram of a servo controller of the first embodiment.

FIG. 6 shows the configuration of the servo controller 400 of the first embodiment for solving this problem. The servo controller 400 includes a proportional integral control calculation section 420, a differential control calculating section 50, a final adder 58 and a final limiting calculator 59. FIG. 6 shows a configuration in which the servo control calculation is equivalently transformed by a discrete formula. The servo controller 400 of the first embodiment calculates the estimated load calculation assist command Tbx* by proportional integral control calculation, and adds the calculation result of the differential control calculation to the estimated load calculation assist command Tbx* so as to calculate the base assist command Tb*. That is, one servo controller 400 collectively calculates both the estimated load calculation assist command Tbx* and the base assist command Tb*.

The proportional integral control calculation section 420 includes a proportional control calculator 430, an integral control calculator 440, an adder 48 and an accumulation processor 490. The proportional control calculator 430 and the integral control calculator 440 perform proportional and integral control calculations based on the steering torque deviation ΔT, similarly to the configuration of the assist controller disclosed in FIG. 4 of Japanese Patent No. 6252027. The disclosure of which is incorporated herein by reference.

A delay element 45 takes out the previous value of the steering torque deviation ΔT. In the proportional control calculator 430, the steering torque deviation ΔT from which the previous value was subtracted by a subtractor 463 is multiplied by a proportional gain Kp by a gain multiplier 473. In the integral control calculator 440, the steering torque deviation ΔT to which the previous value is added by the adder 464 is multiplied by an integral gain Ki by a gain multiplier 474.

The adder 48 outputs the processing target torque TM obtained by adding the proportional control component and the integral control component for each control cycle. Here, the proportional control amount alone is insufficient as an estimated load, and the integral control amount alone cannot be used because the delay with respect to the road surface reaction force is large. The accumulation processor 490 accumulates the processing target torque TM to calculate the current value Tbx*n of the estimated load calculation assist command. The accumulation processing is synonymous with integration processing, but the term "accumulation" is used here to distinguish it from integral control. Although there are differences depending on the calculation configuration of the proportional-integral control calculation section, the point is that a signal subjected to proportional-integral control is output.

The accumulation processor 490 includes an adder 491, a delay element 492 and a limiting calculator 494. The adder 491 adds the previous value $Tbx^*_{n-1}$ of the estimated load calculation assist command input via the delay element 492 to the current value of the processing target torque TM. The limiting calculator 494 limits the addition result of the adder 491 with a limit value that can be output as assist torque. This solves a windup problem, that is, the phenomenon in which the decrease in output is delayed when the sign of the deviation reverses after a value larger than the allowable output is obtained by integration when the deviation continues to appear.

The differential control calculation section 50 includes a pseudo-differential calculator 54 and a gain multiplier 57. The pseudo-differential calculator 54 calculates a steering torque deviation differential D(ΔT) by pseudo-differentiation. The pseudo-differential "D" of the discrete value corresponds to the operational function of $(s/(\tau s+1)^2)$ (where s: Laplace operator, τ: time constant) in terms of the transfer function of a continuous system. The gain multiplier 57 multiplies the steering torque deviation differential D(ΔT) by a differential gain Kd.

The final adder 58 adds the current value $Kd \cdot D(\Delta T)_n$ of the output of the differential control calculation section 50 to the current value $Tbx^*_n$ of the estimated load calculation assist command. The final limiting calculator 59 limits the addition result of the final adder 58 in the same way as the limiting calculator 494 does. This limit has nothing to do with windup, but covers overtemperature protection and fail-safe limits.

The formula for servo control is shown below. The steering torque deviation ΔT is represented by Equation (1).

$$\Delta T = Ts^* - Ts \tag{1}$$

The base assist command Tb* is represented by Equation (2). In the configuration of FIG. 6, the proportional gain Kp, the integral gain Ki, and the differential gain Kd are all set to negative values.

$$Tb^* = Kp\Delta T + Ki/s \times \Delta T + Kd \cdot D(\Delta T) \tag{2}$$

To discretize Equation (2), substituting the bilinear transformation equation represented by Equation (3) into Equation (2) and rearranging, and Equations (4.1) and (4.2) are obtained. ts in Equation (3) indicates a calculation cycle. In FIG. 6, (ts/2)Ki is collectively written as "Ki".

$$s = 2/ts \times (z-1)/(z+1) \tag{3}$$

$$Tbx^*_n = Tbx^*_{n-1} + Kp(\Delta T_n - \Delta T_{n-1}) + (ts/2)Ki(\Delta T_n + \Delta T_{n-1}) \tag{4.1}$$

$$Tb^*_n = Tbx^*_n + Kd \cdot D(\Delta T)_n \tag{4.2}$$

As described above, in the present embodiment, the estimated load calculation assist command Tbx*, which does not include a differential control component, is fed back from the servo controller 400 to the estimated load torque calculation section 20. Therefore, the step change accompanying the gradient change of the target steering torque Ts* is smaller than when the base assist command Tb* is fed back. Therefore, the step change is less likely to circulate in the closed loop and less likely to appear as pulse noise. Therefore, vibration of the motor 80 is suppressed.

Further, when the base assist command Tb* is fed back, the low-pass filter 22 of the estimated load torque calculation section 20 is a secondary filter for removing high frequency components of servo control. Since the low-pass filter 22 does not contain a differential control component, a primary filter can be used, which simplifies arithmetic processing.

Next, with reference to the time charts of FIGS. 7 and 8, in the comparative example and the present embodiment, the behavior of the actual vehicle when the steering wheel is turned left and right so that the steering torque Ts changes from positive to negative and from negative to positive will be explained in comparison. In the comparative example, the base assist command Tb* is fed back to the estimated load torque calculation section 20 from a servo controller that performs normal PID control. A discrete formula for normal PID control is shown in Equation (5).

$$Tb^*_n = Tb^*_{n-1} + Kp(\Delta T_n - \Delta T_{n-1}) + (ts/2)Ki(\Delta T_n + \Delta T_{n-1}) + Kd(D(\Delta T)_n - D(\Delta T)_{n-1}) \tag{5}$$

Figure 7:
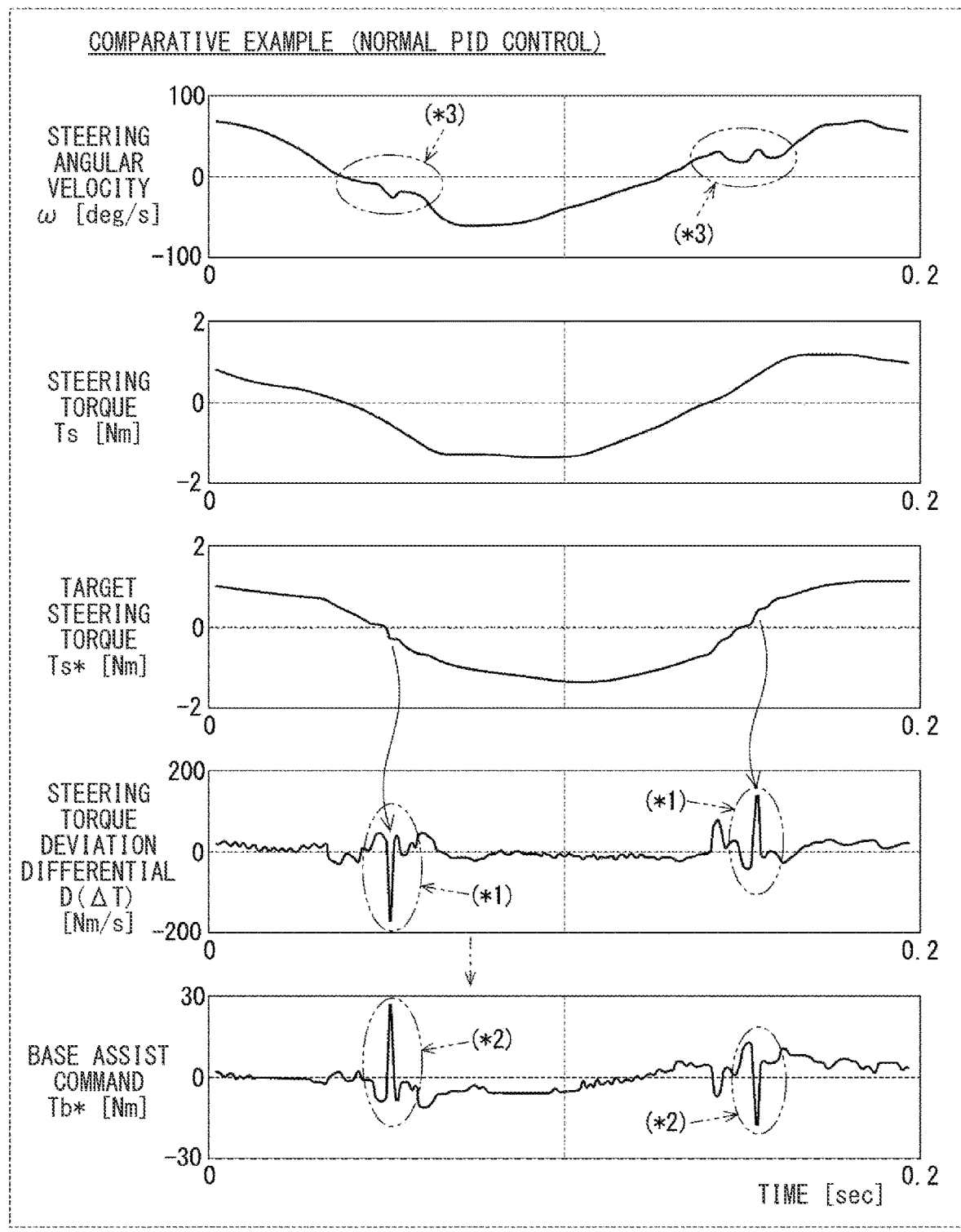
FIG. 7 is a time chart showing an actual vehicle behavior in a comparative example (normal PID control)
Figure 8:
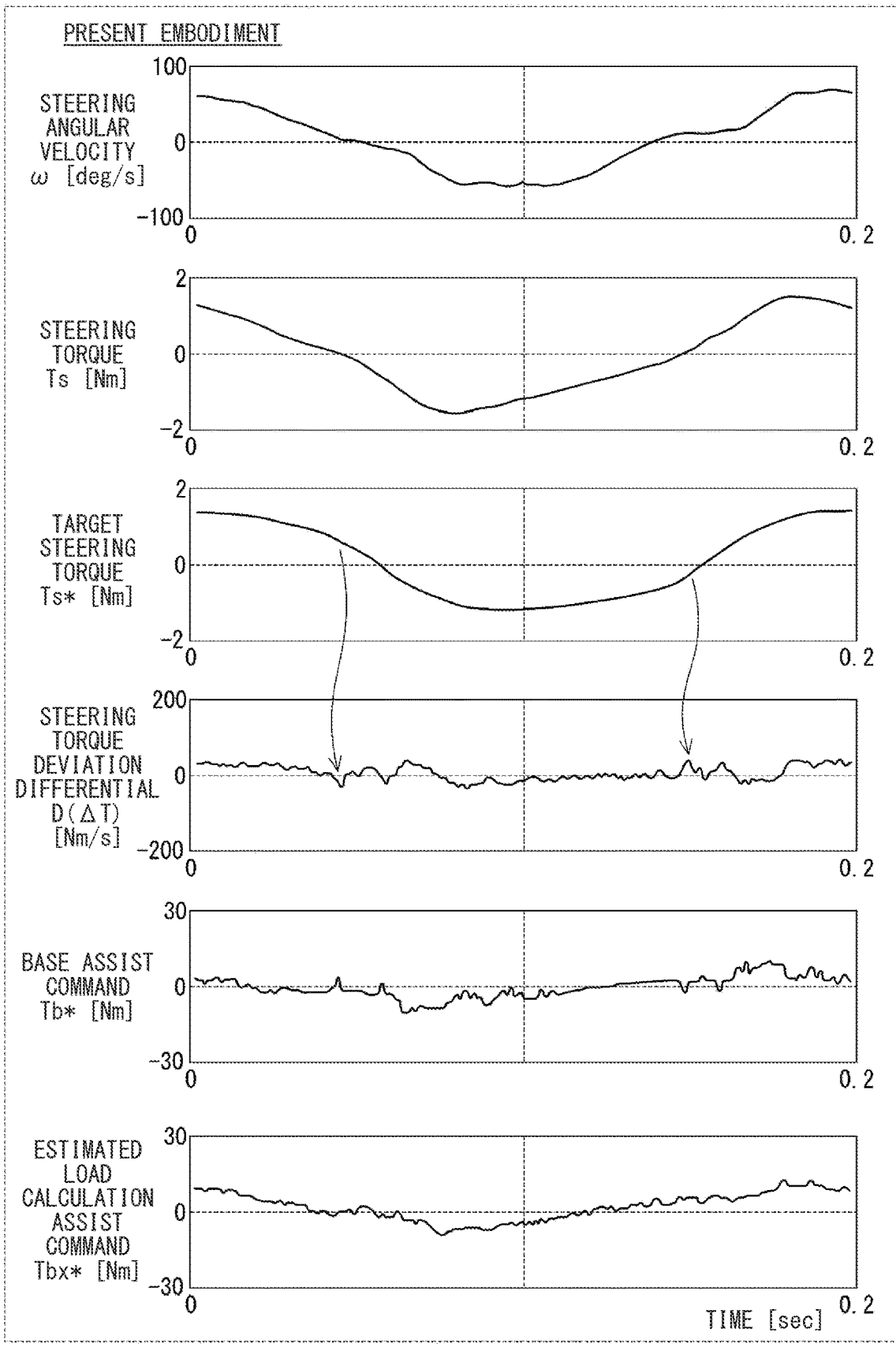
FIG. 8 is a time chart showing the actual vehicle behavior of the present embodiment.

In FIGS. 7 and 8, a steering angular velocity ω, a steering torque Ts, a target steering torque Ts*, a steering torque deviation differential D(ΔT), and a base assist command Tb* are shown in order from the top. Further, in the present embodiment, the estimated load calculation assist command Tbx* is shown at the bottom.

In the comparative example shown in FIG. 7, in a small signal region where the target steering torque Ts* is near 0, the change in the target steering torque Ts* increases when passing through the large bending point on the map (FIG. 3). At that time, the differential control component of the fourth term of Equation (5) changes stepwise. The stepwise change is also reflected in the base assist command Tb* obtained by accumulating in Equation (5).

When this base assist command Tb* is fed back to the estimated load torque calculation section 20, it affects the target steering torque Ts* for the next calculation and stops the change. As a result, the target steering torque Ts* changes stepwise, and as indicated by (*1) and (*2), the steering torque deviation differential D(ΔT) and the base assist command Tb* becomes pulse-like and causes the motor 80 to vibrate.

The influence of vibration due to the pulse current also affects the steering angular velocity ω converted from the motor rotation angle, and the waveform fluctuates as indicated by (*3). Also, focusing on the direction of vibration, the direction is opposite to the direction in which the motor 80 is originally intended to rotate. As a result, it acts as if it is squeezed backwards through the backlash and backlash of the gear, which tends to cause rattle noise.

In the present embodiment shown in FIG. 8, even if the target steering torque Ts* passes through the large bending point of the map and the change in the target steering torque Ts* becomes large, the estimated load calculation assist command Tbx* does not include a differential control component so that the stepwise change is small.

Therefore, the estimated load calculation assist command Tbx* obtained by accumulating in equation (4.1) is free of pulse noise. Furthermore, the base assist command Tb*, which is determined in the circulation system in which the target steering torque Ts* is calculated based on the estimated load torque Tx calculated from the estimated load calculation assist command Tbx*, is free of pulse noise. As a result, in the present embodiment, a smooth actuator operation with low noise is realized without generating rattle noise.

Second Embodiment

Figure 9:
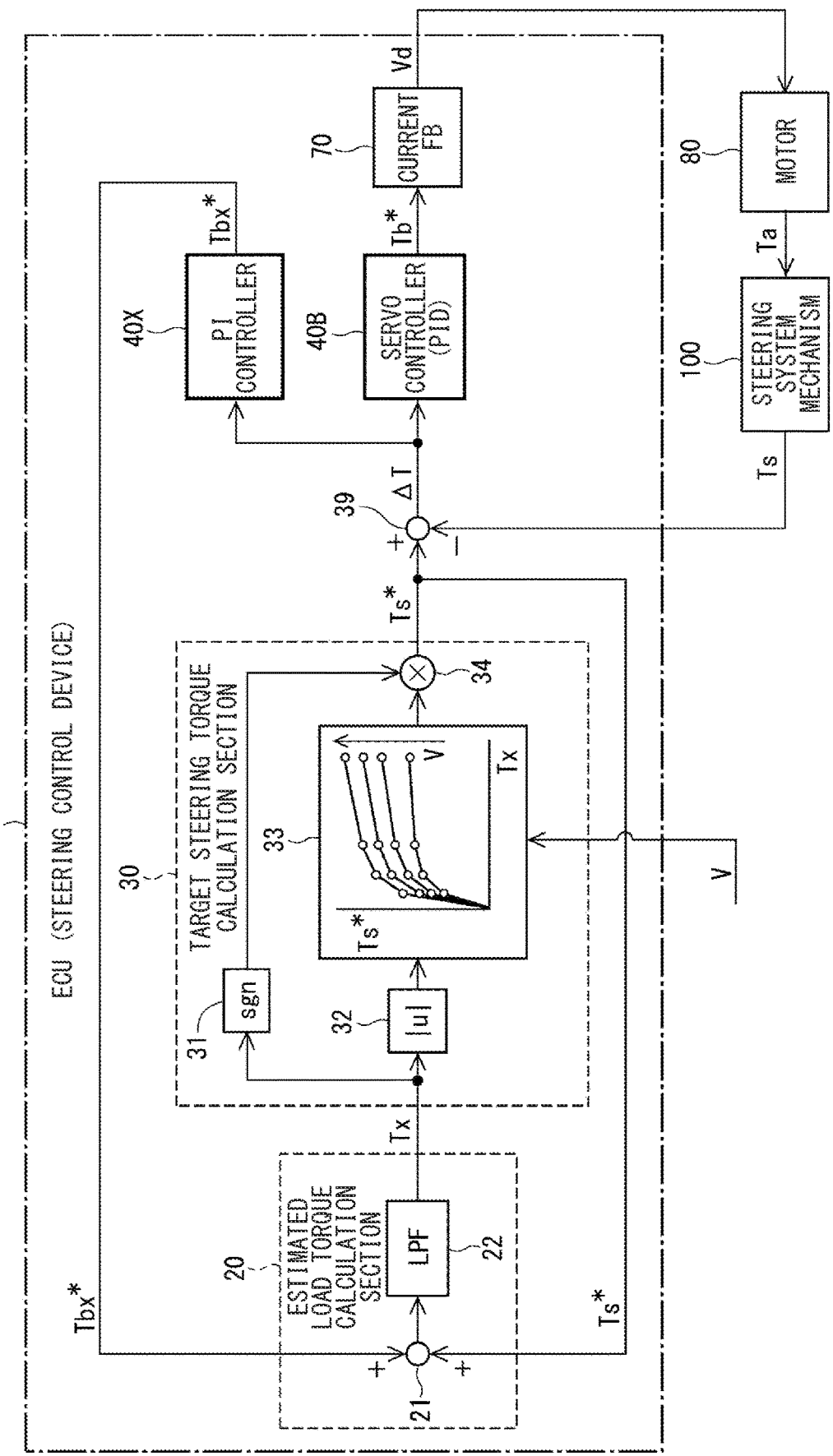
FIG. 9 is a schematic configuration diagram of an ECU (steering control device) according to a second embodiment.

With reference to FIG. 9, the configuration of the ECU 10X according to the second embodiment will be described mainly regarding the differences from the first embodiment. The same reference numerals are assigned to substantially the same configurations as in the first embodiment, and the description thereof is omitted. In the ECU 10X of the second embodiment, instead of the servo controller 400 of the first embodiment, a servo controller 40B and a PI controller 40X are separately provided.

The servo controller 40B calculates the base assist command Tb* by PID control calculation. The configuration of the servo controller 40B may be the same as that shown in FIG. 4 of Japanese Patent No. 6252027, for example. The PI controller 40X calculates the estimated load calculation assist command Tbx* by a proportional-integral control calculation that does not include a differential control calculation. The estimated load calculation assist command Tbx* corresponds to a calculation result of only the proportional integral control calculation among the control calculations in the servo controller 40B. The configuration of the PI controller 40X is the same as that of the proportional integral control calculation section 420 in FIG. 6. Even with such a separation configuration, the same effect as in the first embodiment can be obtained.

Other Embodiments (a) The estimated load torque calculation section 20 may calculate the estimated load torque Tx based on the steering torque Ts instead of the target steering torque Ts*.

(b) The target steering torque Ts* is not only calculated based on the estimated load torque Tx, but also may be added with steering torque corresponding to other state quantities such as the steering angle and the steering angular velocity, or may be corrected according to other state quantities. For example, Japanese Patent No. 6387657 discloses a configuration example in which a steering angle reference correction torque is added to an estimated load torque. The disclosure of which is incorporated herein by reference.

The present disclosure is not limited to such embodiments but can be implemented in various forms without deviating from the spirit of the present disclosure.

The control unit and the technique according to the present disclosure may be achieved by a dedicated computer provided by constituting a processor and a memory programmed to execute one or more functions embodied by a computer program. Alternatively, the control units and the methods thereof described in the present disclosure may be implemented by a dedicated computer including a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A steering control device for controlling an assist torque output by a motor connected to a steering system mechanism that generates a steering torque, the steering control device configured to inhibit a steepening of a gradient of a target steering torque, the steepening occurring at a breakpoint within a signal region of a map that defines a relationship between an estimated load torque and the target steering torque, the steering control device comprising:
a servo controller configured to calculate a base assist command, which is a basic command value of the assist torque, so that the steering torque follows the target steering torque;
an estimated load torque calculation section configured to calculate the estimated load torque, which is load torque acting on a steering shaft of the steering system mechanism; and
a target steering torque calculation section configured to calculate the target steering torque using the map that defines the relationship between the estimated load torque and the target steering torque,
wherein
the estimated load torque calculation section calculates the estimated load torque based on (i) the steering torque or the target steering torque and (ii) an estimated load calculation assist command corresponding to a calculation result of only a proportional integral control calculation.

2. The steering control device according to claim 1, wherein the servo controller calculates the estimated load calculation assist command by the proportional integral control calculation, and adds a calculation result of a differential control calculation to the estimated load calculation assist command so as to calculate the base assist command.

3. A steering control device for controlling an assist torque output by a motor connected to a steering system mechanism that generates a steering torque, the steering control device configured to inhibit a steepening of a gradient of a target steering torque, the steepening occurring at a breakpoint within a signal region of a map that defines a relationship between an estimated load torque and the target steering torque, the steering control device comprising:
a computer including a processor and a memory that stores instructions configured to, when executed by the processor, cause the processor to
calculate a base assist command, which is a basic command value of the assist torque, so that the steering torque follows the target steering torque;
calculate the estimated load torque, which is load torque acting on a steering shaft of the steering system mechanism;
calculate the target steering torque using the map that defines the relationship between the estimated load torque and the target steering torque; and
calculate the estimated load torque based on (i) the steering torque or the target steering torque and (ii) an estimated load calculation assist command corresponding to a calculation result of only a proportional integral control calculation.

4. The steering control device according to claim 3, wherein the computer causes the processor to
calculate the estimated load calculation assist command by the proportional integral control calculation, and
add a calculation result of a differential control calculation to the estimated load calculation assist command so as to calculate the base assist command.

5. The steering control device according to claim 1, wherein
the steepening of the gradient of the target steering torque at the breakpoint occurs when the estimated load torque is close to zero.

* * * * *